United States Patent [19]

Forster et al.

[11] Patent Number: 5,294,227
[45] Date of Patent: Mar. 15, 1994

[54] SELF-TAPPING SCREW

[75] Inventors: Hubert Forster, Moorenweis; Armin Herb, Apfeldorf, both of Fed. Rep. of Germany

[73] Assignee: Hilti Aktiengesellschaft, Liechtenstein

[21] Appl. No.: 980,006

[22] Filed: Nov. 23, 1992

[30] Foreign Application Priority Data

Nov. 23, 1991 [DE] Fed. Rep. of Germany ....... 4138555

[51] Int. Cl.$^5$ ...................... F16B 25/00; F16B 35/04
[52] U.S. Cl. ...................... 411/386; 411/412; 411/426
[58] Field of Search ............... 411/386, 387, 412, 413, 411/426

[56] References Cited

U.S. PATENT DOCUMENTS

| | | | |
|---|---|---|---|
| 3,207,023 | 9/1965 | Knohl | 411/412 |
| 3,937,119 | 2/1976 | Ernst | 411/426 |
| 3,942,405 | 3/1976 | Wagner | 411/386 |
| 4,323,326 | 4/1982 | Okada et al. | 411/412 |
| 4,655,661 | 4/1987 | Brandt | 411/412 X |
| 5,061,136 | 10/1991 | Dixon et al. | 411/412 |

*Primary Examiner*—Neill R. Wilson
*Attorney, Agent, or Firm*—Anderson, Kill, Olick & Oshinsky

[57] ABSTRACT

A self-tapping screw has a cutting thread formed by two separate threads (3, 4). An imaginary envelope (5) defines a annular space (5) laterally enclosing the screw shank and has a section (5a) tapering inwardly along an inwardly tapering leading end section (1a) of the shank (1). The inwardly tapering section of the annular enclosing space an envelope forms an angle (B) considerably larger than the angle (A) formed by the tapering leading end section (1a) of the shank. The leading ends (3a, 4a) of the separate threads (3, 4) are located diametrically opposite one another for uniform distribution of the forces developed when the screw penetrates into a hard receiving material, such as concrete, masonry, gas concrete and the like.

6 Claims, 1 Drawing Sheet

SELF-TAPPING SCREW

BACKGROUND OF THE INVENTION

The present invention is directed to a self-tapping screw for use in hard receiving materials, such as concrete, masonry, gas concrete and the like with cutting threads extending around the screw shank. An annular enclosing space is defined around the screw shank by the thread tip with the space having a cylindrical shape along an axially extending part of the screw shank and then tapering inwardly toward the screw tip so that the axial ends of the inwardly tapering enclosing space is located within an axially extending section of the tapering leading end of the screw with the leading end of the cutting thread forming the leading end of the enclosing space.

Screws of the above type are used in a self-tapping or self-cutting operation in different receiving materials. Such receiving materials can be concrete, masonry, gas concrete and the like, covering a spectrum ranging from porous to harder materials. With harder material, such as concrete, the setting operation occurs initially by preboring to a diameter corresponding approximately to the diameter of the core or outer surface of the screw shank. In porous material, the screws are set or installed directly, that is, without preboring. If a screw is set without preboring, there is a considerable time saving in the setting operation. As a result, the screws under discussion have been successful in situations where they can be set without preboring, that is, in the various types of gas concrete presently in use.

Since there is an increasing use of gas concrete, especially in the rehabilitation of older buildings, the demand for simple and reliable settable screws, which can be installed in a self-tapping manner, is on the increase. Such screws are used for fastening all kinds of objects, such as wall cabinets, pipe hangers, ceiling hangers, appliances and many others.

A main requirement for self-tapping screws is that they can be threaded into a receiving material without causing resistance to any great extent. This requirement is not satisfied by most of the screws presently in use, since the core of the screw and the tapping threads are in such a relationship to one another, that there is a considerable increase in resistance after the first revolution during the setting of the screw. Installing such screws without exerting the required effort or force is thus impossible. The effort required by operating personnel results in a cumbersome setting procedure and, in addition, in considerable irregularities in the penetration of the screw into the receiving material, whereby the fastening quality suffers greatly because of this last-named disadvantage. Moreover, the fastening quality is especially questionable, if interruptions in the application of the setting force occurs due to fatigue by the operating personnel.

It has been found that the disadvantage of such increasing resistance during setting screws can be avoided, if the leading end of the screw is configured as a so-called "corkscrew tip". The characteristics of such a screw end results in the core tapering toward the screw tip at an angle which is considerably smaller than the angle of the enclosing space formed by the thread tips of the tapering part of the cutting thread. A self-tapping screw with a leading end formed in this manner is disclosed in U.S. Pat. No. 4,536,117.

The screw disclosed in this patent can solve the disadvantages involved in the increasing resistance when the screw is threaded in, however, it has another significant disadvantage. This disadvantage is that the leading end of the cutting thread extending from the screw core occurs asymmetrically and, as a result, the leading end of the screw is is urged to one side when penetrating into the receiving material causinh an irregular hunting motion. This hunting motion can continue during further threading-in of the screw, whereby the cutting thread insufficiently penetrates into the receiving material, resulting in an inadequate fastening quality. Moreover, the irregular hunting motion is transmitted to the driving device, such as a hand-held drilling tool, so that in addition to the vibration phenomenon which is inconvenient for operating personnel, more or less permanent damage can occur in the drilling device.

SUMMARY OF THE INVENTION

Therefore, it is the primary object of the present invention to provide a self-tapping screw distinguished by an effective threading-in behavior, so that a high fastening quality can be attained.

In accordnce with the present invention, the cutting thread of the screw is formed of two different threads. Due to the arrangement of the two separate threads, a symmetrical force distribution is obtained at the commencement of the setting operation, as well as during the continued threading-in of the screw. Since an imaginary envelope is defined by the outer thread tips, and forms an annular enclosing space having an axially extending inwardly tapering section located within the range of the inwardly tapering section of the screw core, the angle formed by the tapering section of the enclosing space is necessarily larger than the angle of the tapered leading end section of the core. As a result, there is the known effect in which the screw is pulled into the receiving material by the cutting threads, so that no increase in resistance during the threading-in operation occurs.

To prevent the screw from tilting during spot drilling, which can occur through one-sided penetration of the cutting thread into the receiving material, the leading ends of the two threads are located on the tapered section of the core and are disposed in a plane extending perpendicularly to the screw axis. Accordingly, it is assured that both threads penetrate into the receiving material simultaneously assuring that the screw is pulled into the receiving material.

Apart from the simultaneous engagement of the thread in the receiving material, it is further advantageous if the two threads engage symmetrically relative to the screw axis and this is effected by arranging the leading ends of the two threads located on the tapered section of the core and disposed diametrically opposite one another. Due to this arrangement of the leading ends of the two threads, tilting as well as the hunting motion of the screw is avoided and this last-mentioned phenomenon is avoided particularly due to the symmetrical division of the forces in spot drilling or starting the drilling of the threads in the receiving material.

Especially for reducing the resistance when the self-tapping screw is threaded-in, as well as assisting the pulling-in of the screw into the receiving material, it is advantageous if one of the threads has a smaller height outwardly from the screw core than the other thread at least for an axially extending core section adjoining the tapered section of the core. This section of the screw shank where one of the threads has a smaller height than the other extends only for a given axial section of the entire screw shank. This axial section can range between one-third and one-half of the overall axial length of the screw shank. Adjacent this axial section on the opposite side from the screw tip, the smaller thread height increases advantageously within the range of one-half to a full thread turn until it reaches the height of the other thread, so that the screw is provided with two threads having the same thread height.

The angle of the tapered section of the enclosing space or envelope defined by the outer tips of the cutting threads is in the range of 90° to 120°, while the angle of the tapered section of the core amounts approximately to half of the above angle and is preferably about 45°. With such angular relationships favorable conditions are achieved, which lead to a sufficient pulling-in action on the screw into the receiving material and, in addition, to providing a sufficiently strong leading end of the screw. Preferably, the leading ends of the thread on the screw core are offset rearwardly from the screw tip, whereby a centering tip is formed. The amount of the offset is preferably approximately one-third of the axial length of the tapered section of the core. The inward taper of the enclosing space is spaced toward the leading end of the screw by approximately one-third of the axial length of the tapered section of the core.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
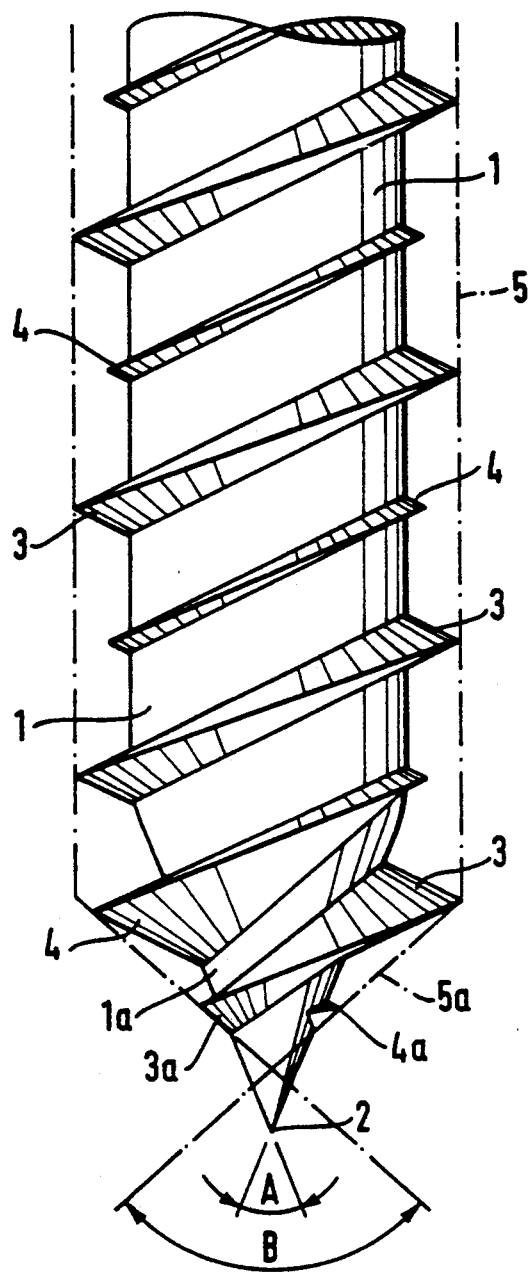
FIG. 1 is a side view of an axially extending leading end section of a self-tapping screw, embodying the present invention.

In FIG. 1 the leading end axially extending section of a self-tapping screw is shown comprising a screw shank or core 1. The screw shank 1 has a leading end with a punctiform screw tip 2. The screw shank 1 is provided with a cutting thread formed by two separate threads 3, 4 extending from adjacent the leading end or tip 2 toward the trailing end, not shown. The thread 4 has a smaller thread height than the thread 3 in the illustrated axially extending cylindrically-shaped section of the screw shank 1.

In FIG. 1, it can be seen that an imaginary annular enclosing space or envelope 5, shown in dotted lines, is defined radially outwardly by the thread tips of the thread 3. Toward the leading end of the screw shank 1, the enclosing space or envelope 5 tapers inwardly toward the shank. The opposite axial ends of the tapered section 5a of the enclosing space or envelope 5 are located within the axial range of the tapered section 1a of the shank 1. Leading ends 3a, 4a of the threads 3, 4 are located on the tapered section 1a spaced from the leading end or tip 2 of the shank. Accordingly, different angles A, B are formed by the surfaces of the tapered section 1a of the shank and the tapered section 5a of the enclosing space 5. The angle A of the tapered section 1a of the shank is about one-half the angle B of the tapered section 5a of the enclosing space 5.

Figure 2:
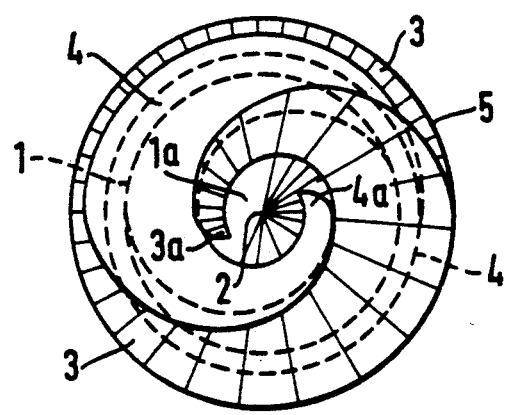
FIG. 2 is an end view taken at the leading end of the screw in FIG. 1.

It can be noted in FIG. 2 that the leading ends 3a, 4a of the threads 3, 4, extending from the tapered section 1a of the shank, are located diametrically opposite one another. The radially outer limits of the enclosing space or envelope 5 corresponds in FIG. 2 to the radially outer edge at least of the thread 3 and possibly after the thread height of the thread 4 is increased, as mentioned above, corresponds to the radially outer edge of the thread 4.

While a specific embodiment of the invention has been shown and described in detail to illustrate the application of the inventive principles, it will be understood that the invention may be embodied otherwise without departing from such principles.

We claim:

1. Self-tapping screw for use in hard receiving materials such as concrete, masonry, gas concrete and the like, said screw has an axially extending shank with an inwardly tapering leading end section terminating in a punctiform tip, cutting thread means for forming threads in the hard receiving material projects laterally outwardly from said shank and has a leading end located in the tapering leading end shank section and extending around said shank away from the shank tip, said cutting thread means having a thread tip spaced laterally and outwardly from and extending around said shank from the leading end of said cutting thread means, wherein the improvement comprises an imaginary enclosing envelope encircling and contacting said thread tip from the leading end of said cutting thread means and defines a radially outer boundary of an axially extending annular space enclosing said shank with the envelope adjacent the shank tip comprising an axially extending section tapering inwardly toward the shank tip to the leading end of said cutting thread means and forms a punctiform tip within the tapering leading end shank section, and said cutting thread means comprises two separate threads (3, 4).

2. Self-tapping screw, as set forth in claim 1, wherein that the leading ends of the two threads (3, 4) are located in the tapering leading end shank section (1a) and are located in a common plane extending perpendicularly to the screw axis.

3. Self-tapping screw, as set forth in claim 2, wherein the leading ends (3a, 4a) of the two threads (3, 4) lie diametrically opposite one another.

4. Self-tapping screw, as set forth in claims 1, 2 or 3, wherein one of the threads (4) has a smaller thread height extending radially outwardly from the screw shank (1) than the other thread (3) in an axially extending region of the shank (1) adjacent the tapering leading end shank section (1a), and said other thread forms said thread tip.

5. Self-tapping screw, as set forth in claims 1, 2 or 3, wherein diametrically opposite sides of said axially extending section of the enclosing envelope (5) tapering inwardly forms an angle in the range of approximately 90° to 120°.

6. Self-tapping screw, as set forth in claim 5, wherein the diametrically opposite sides of inwardly tapering leading end shank section forms an angle (A) of approximately 45°.

* * * * *